March 14, 1967  W. B. GEORGE ET AL  3,309,083
SELECTIVE SOUND RESPONSIVE AMUSEMENT OR EXERCISING DEVICES
Filed Feb. 27, 1961  7 Sheets-Sheet 1

*INVENTORS*
WILLIAM B. GEORGE
JOHN C. HILL
BY ANTHONY GUMIENNY
DAVID L. SNIDER

*ATTORNEYS*

INVENTORS
WILLIAM B. GEORGE
JOHN C. HILL
BY ANTHONY GUMIENNY
DAVID L. SNIDER

ATTORNEYS

March 14, 1967  W. B. GEORGE ET AL  3,309,083
SELECTIVE SOUND RESPONSIVE AMUSEMENT OR EXERCISING DEVICES
Filed Feb. 27, 1961  7 Sheets-Sheet 3

INVENTORS
WILLIAM B. GEORGE
JOHN C. HILL
BY ANTHONY GUMIENNY
DAVID L. SNIDER
ATTORNEYS

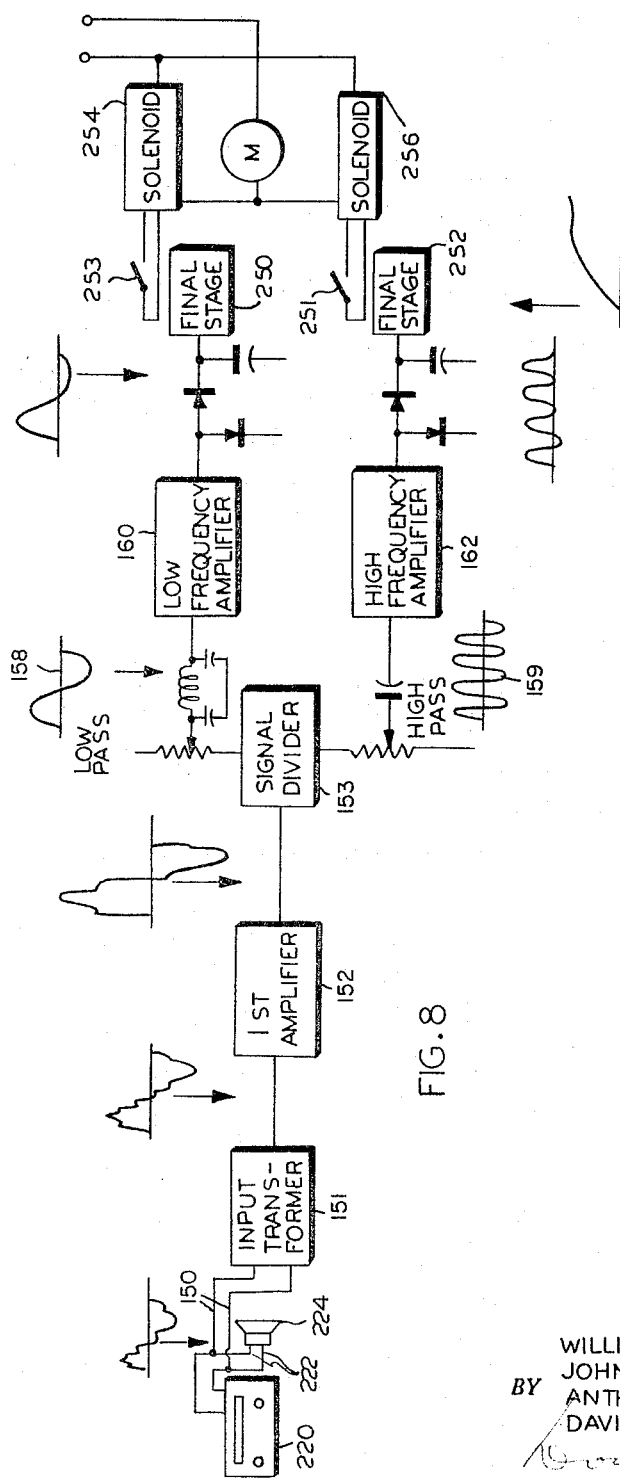

United States Patent Office 3,309,083
Patented Mar. 14, 1967

3,309,083
SELECTIVE SOUND RESPONSIVE AMUSEMENT OR EXERCISING DEVICES
William B. George, R.F.D. 4, Box 18, St. Clairsville, Ohio 43950; John C. Hill, National Road W., St. Clairsville, Ohio 43950; David Lee Snider, R.D. 5, Cadiz, Ohio 43907; and Anthony Gumienny, 45 W. Maynard Ave., Columbus, Ohio 43202
Filed Feb. 27, 1961, Ser. No. 92,071
3 Claims. (Cl. 272—53.1)

This invention relates to apparatus for amusement, recreation, exercise and therapy.

The invention is based upon the concept of broadening the present utility of transcribed or broadcast intelligence to achieve a new dimension in communication by providing apparatus operable to effect a greater stimulation of the senses of the body for psychological and physical benefit.

As is well known, there exists a large number of media designed for entertainment or recreation by operation upon the sense, particularly sight and/or hearing, including television, radio, disk and tape recording apparatus, film projectors and the like. The pleasure and enjoyment flowing from the use of these devices is derived solely by the vicarious psychological reactions to sense stimulus. The present invention contemplates adding a third dimension to such vicarious pleasure which should have an effect as salutary as that effected by the addition, through television, of the second dimension, sight, to radio. Moreover, the present invention operates not only to complement existing communication media but also in cooperative conjunction therewith. Furthermore, the present invention operates on the particular sense most capable of rendering relaxation or stimulation through the body to the mind and to the body independent of the mind.

An additional utility anticipated by the present invention is to put to a new and beneficial use the vast amount of broadcast program material which heretofore has been used only for visual or auditory sense stimulation. Aside from standard video and audio program material, there are presently employed numerous non-audible frequencies as well as special broadcasts on non-standard frequencies which can be coordinated with the apparatus herein described to increase the effect and use of radiated intelligence signals for audience participation. A further advantage inherent in the present invention is the expanded enjoyment and effectiveness given to recording and reproducing equipment presently owned by the public in general and health establishments in particular.

In order to assure a more complete appreciation of the general and detailed description to follow, the devices with which the present invention has utility are listed below. The list is exemplary.

(1) Standard television receivers;
(2) Standard AM and FM radio receivers;
(3) Standard phonograph record players;
(4) Standard tape and wire recorders;
(5) Electric organs and guitars;
(6) Sound film projectors;
(7) Private intercommunication systems.

To further assure the understanding of the utility of the present invention to those skilled in the art, the following exemplary list of uses is included.

(1) As an aid in the enjoyment of visual and auditory forms of communication;
(2) As an aid in interpretation of visual and auditory forms of communication;
(3) As an aid in instruction and in extending enjoyment to the blind;
(4) To provide body movement and circulatory stimulation during periods of inactivity imposed by concentration on visual and auditory presentations;
(5) As a means to aid in exercise;
(6) As a tool in the medical and psychiatric field for use with paralytic and mentally disturbed patients.

More specifically, the present invention contemplates the provision of means whereby selected portions of broadcast or transcribed intelligence can be employed to variably control a multi-motion device such as a hobbyhorse or a health bed or chair to synchronize body movement with program material. Children who have a motorized hobbyhorse capable of up-and-down and/or forward-and-backward movement operable in accordance with the present invention will be able to participate vicariously in their various favorite western adventure programs to an extent not heretofore feasible. The child, in addition to the visual and auditory sensations derived from a televised program, will now become an active participant riding along with the actors of his interest. The additional psychological condition provided by the present invention will effect a more complete symbolic imagery and realism by enabling the child to more fully identify himself with the actors and plot of his favorite program. The thrill and adventure which these programs are most carefully designed to create will thus be extended by a third dimension of movement added to sight and hearing. A still further advantage of the present invention lies in the fact that non-voluntary body movement will be accomplished to break the fixed stare so often developed by concentration of the mind and so widely accepted as damaging to the eyes, particularly of young children.

The general medical value of health chairs or other movement imparting devices to both body and mind is attested to by their widespread use in homes, hospitals and health spas as well as by numerous testimonials of lay and professional people. Massage and vibration of the body is known to benefit muscular tension and body fluid circulation. Alternate elevation of parts of the body is recognized as helpful and even necessary in the treatment of many physical ailments. Devices such as health chairs operate on the body directly and on the mind through the body for physical and mental stimulation and relaxation. Music, on the other hand, operates on the mind first and on the body through the mind. The universal use of music for relaxation is well known as is its employment therapeutically. Many health establishments utilize the combined effects of body movement and music to achieve the desired result of cooperative exercise and relaxation.

The apparatus herein described will extend and coordinate the benefits of both physical and mental stimulation by keying motion to ryhthm and movement of music and/or visual stimulation. Special recording tapes or records can be made up with a tri-sensory format designed to achieve either relaxation or stimulation for revivifying purposes or for pleasurable exercise. Additionally, the present invention will place another tool in the hands of psychiatrists for experimentation with new techniques in communicating and aiding the emotionally sick.

It is an object of the present invention to provide an apparatus for the amusement of children through movement and body stimulation keyed to the program format of devices such as television, radio and the like.

It is another object of the invention to provide an apparatus for physical and mental stimulation without the need for conscious voluntary participation to reduce fatigue and passivity as well as to increase body circulation during the normal and usual periods produced by concentration on television and radio program format.

It is still another object of this invention to provide means whereby an additional form of communication can be utilized to extend the designed impact of the living qualities of various media to heighten enjoyment through the sensory perception of movement or motion.

It is still another object of invention to provide means capable of effecting a healthful and relaxing combination of the various forms of communications to the benefit of tired and tense persons as well as senior citizens, invalids and the blind.

It is a further object of the invention to provide a novel experimental tool for use with emotionally disturbed persons in conjunction with music therapy and other forms of helpful activity wherein the purpose is to establish communication by controlled application of body motion sensation in conjunction with music, speech, sight or combination thereof.

It is a particular object of the invention to provide means utilizing either public program material or special programs having sound effects and/or other signals to control applied motion in either an automatic fashion or in a manner independent of arbitrary interpretation by the invention apparatus.

It is another particular object of the invention to provide means which can be utilized to extend communication to include the sense of movement in a predetermined manner to various power driven devices including rocking or hobbyhorses, health chairs and beds and the various vibrating and massaging equipments used for exercising and recreation.

The novel features characterizing the present invention in both its operation and organization will be better understood from the description hereinafter following considered in conjunction with drawings of exemplary embodiments illustrative of the invention, its structure and mode of practice. It is to be understood, however, that the description and drawings are for the purposes of disclosure to enable those skilled in the art to comprehend the invention. The definitiion of the scope and limits of the invention are to be delineated solely by the appended claims.

In the drawings:

FIGURES 1a and b, are perspective views of two devices with which the invention may be used as an integral part thereof. FIGURE 1a represents a health chair and FIGURE 1b represents a hobbyhorse.

FIGURE 2a shown in perspective the mechanical arrangement and frame construction of one embodiment of the power train portion of the invention. FIGURE 2b is a section of FIGURE 2a taken along line 2B—2B and shows in detail the power train control device operable with the final stage of the power train.

FIGURE 8 is a schematic view showing the general arrangement of the invention with the various signals developed thereby.

The general organization of the invention which comprises both method and apparatus includes a motorized device capable of imparting movement to the body of a person, mechanically controlled by an electronic and electric circuit. The electronic circuit will be hereinafter referred to as the control circuit and the electric circuit will be referred to as the control actuating circuit. The invention contemplates the provision of novel aspects of each of the parts of the motorized device, the control circuit and the control actuating circuit in combination and the method by which the results and objects above-mentioned may be achieved. The motorized devices herein described are of the type having at least two modes of operation as, for example, an up-and-down movement and a forward-and-backward movement. The control circuit of the invention serves to control the motorized device to effect either or both of these modes of operation responsive to the frequency content of electrical signals imposed thereon. The control actuating circuit serves to translate the control signals developed by the control circuit into a mechanical operation capable of modulating the power train of the motorized device. In essence, frequency content of program material in the form of speaker or audio voltages are employed to selectively operate a motorized device in a variety of modes. More explicitly, and for example, music frequincies are utilized to effect one mode of movement by the motorized device and horse hoof or galloping frequencies are utilized to effect a second and different mode of movement by the motorized device. The control circuit of the invention accomplishes this functioin by operating on the audio speaker voltages of various devices to divide such voltages into two channels of different frequency signals and to amplify such signals to a level sufficient to drive the control actuating circuit and thereby operate the motorized device.

With the foregoing general concepts in mind, a detailed description of the invention, its method and structure will be given with a first treatment of the mechanical arrangement followed by a description of the control actuating circuit and the control circuit itself.

*Mechanical arrangement*

Figure 1A:
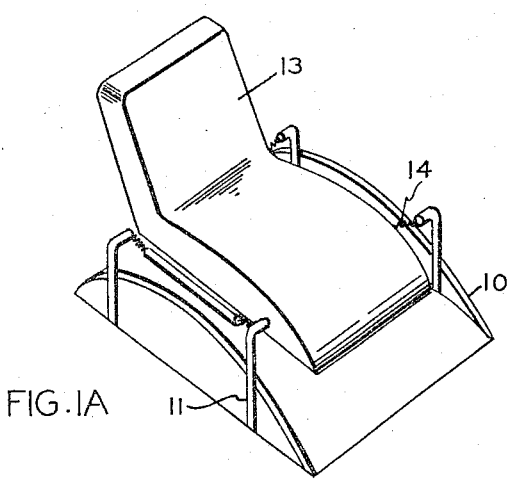
Figure 1B:
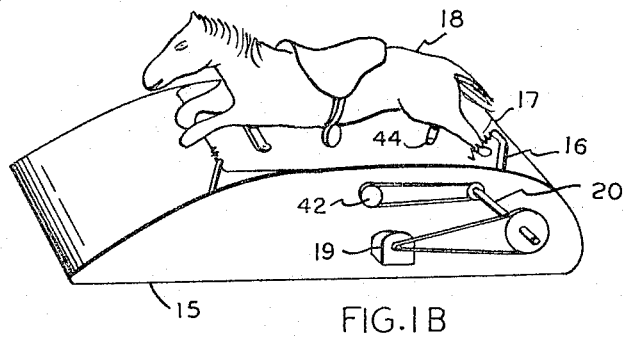

Referring to FIGURE 1a, there is shown a motorized chair of the type with which the present invention may be employed. The chair comprises a body support portion 13 movably and resiliently mounted by springs 14 secured to vertical arms 11 which are in turn secured to a base 10. Various movements to a body resting upon the portion 13 are obtained through a power train, not shown, mounted in the base of the unit. In FIGURE 1b, a hobbyhorse is similarly equipped with a horse body 18 supported by springs 17 on vertical arms 16 secured to base 15. A power train is disposed as indicated in the base portion 15 with a motor 19 drivingly connected through shafting 20 to an actuating arm 44 (shown in FIG. 2a) which connects the horse body 18 at the underside thereof with a radial point on sheave 42.

Figure 2B:
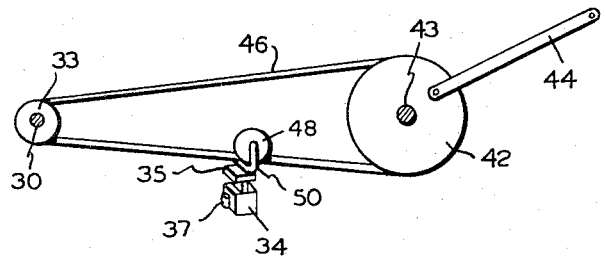
Figure 2A:
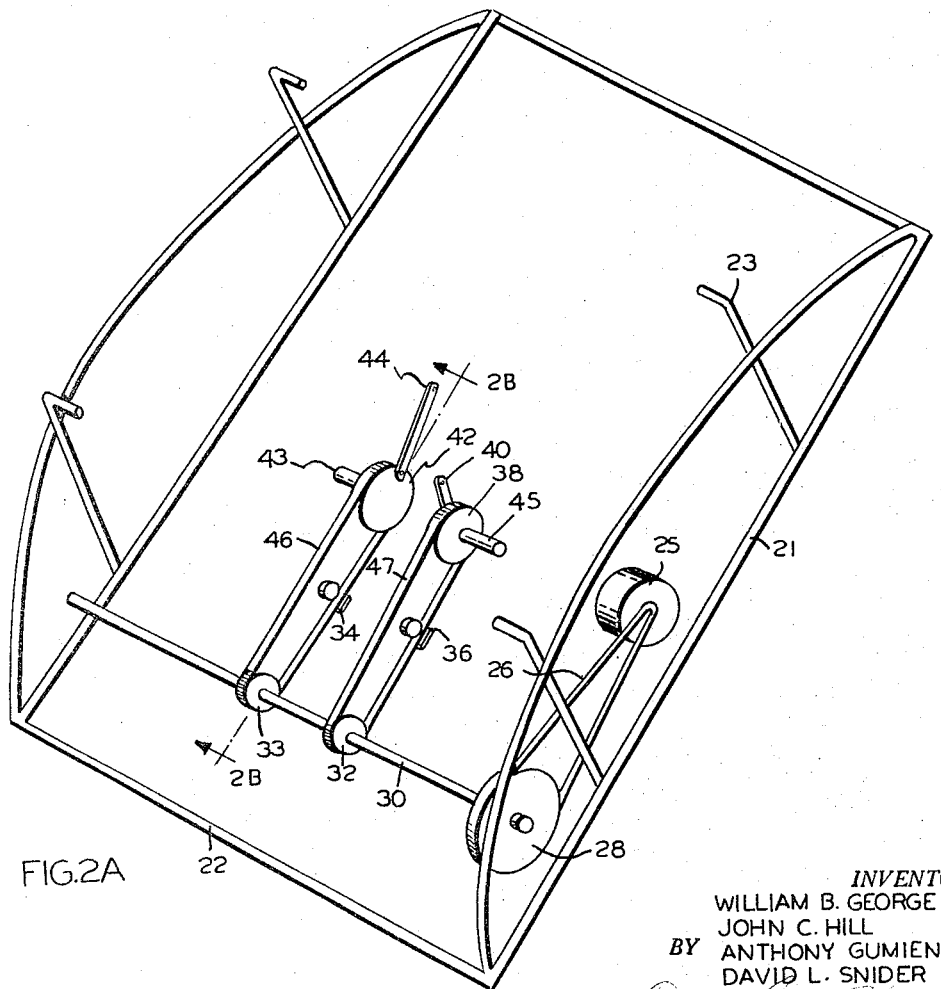

FIGURE 2a shows in greater detail the construction of the mechanical portion of the invention with a supporting frame having a base comprised of elements 21 and 22 which may be optionally secured to the floor upon which the unit rests. Vertical arms 23 are secured to elements 21 and to other frame elements to form an integral support structure. The frame elements can be steel or aluminum tubing, angle iron or extruded metal shafts welded, bolted or otherwise linked together. Disposed within the frame and supported thereby is a motor 25 connected to drive a power train linkage including a belt 26, a first sheave 28 secured to a shaft 30 carrying second and third sheaves 32 and 33, each in turn carrying belts 47 and 46. Fourth and fifth sheaves 38 and 42 are provided for driving connection with the belts 47 and 46, respectively. It is, of course, to be understood that the shaft 30 and the shafts 43 and 45 for sheaves 42 and 38 are adequately supported by bearing means omitted for clarity of disclosure. Each sheave 42 and 38 carries pivotally mounted on an internal radius thereof a connecting arm which is attached to the body support portion of the device. It will be apparent that rotation of the sheaves 38 and 42 will drive arms 40 and 44 to respectively apply an up-and-down movement and a forward-and-backward movement to the body support portion to which they are connected. Control actuators 34 and 36 are disposed intermediate the sheave sets 33–42 and 32–38 in operable connection with belts 46 and 47.

Figure 3:
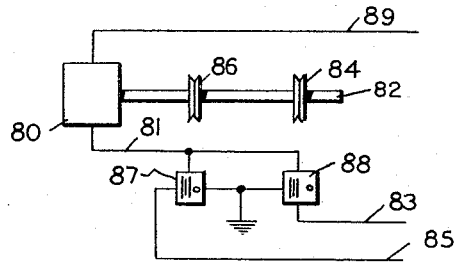
FIGURES 3 and 4 show various embodiments of motor and sheave arrangements with the control leads and actuators therefor.
Figure 4:
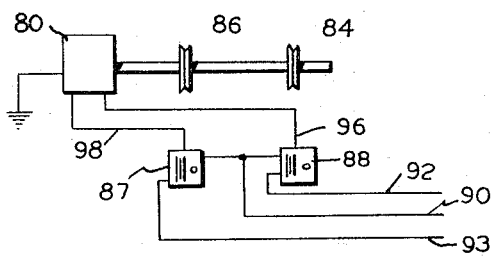

A clear understanding of the operation of actuators 34 and 36 in connection with power train shown therewith may be had by referring to FIG. 3. FIGS. 3 and 4 show two similar embodiments of the electrical circuitry used with the power train actuators 34 and 36, which have corresponding actuators 87 and 88 in FIGS. 3 and 4.

FIGURE 2b shows in greater detail the control actuator and its operation. The actuator comprises a frame portion 35 housing a coil or coils 37 forming an electromagnetic structure with a centrally disposed movable armature 50 carrying a sheave 48. Energization of the coil 37 will draw armature 50 to effect a downward motion of sheave 48 and tension belt 46. This operation will increase the frictional contact between belt 46 and sheaves 33 and 42 to produce a power transfer therebetween. De-energization of the unit 34 will release the sheave 48 and natural belt stiffness combined with a proper placement of the sheaves will permit belt slippage so as to stop power transfer between sheaves. It will now be apparent that a control application of power to actuating arms and the body support there connected can be selectively effected by energization of units 34. The body support and a person thereon can thus be driven in a first mode and a second mode or a combination of modes of movement dependent upon electric control signals.

Control actuating circuit

FIGURES 3 and 4 show two embodiments of motor power trains and control circuit actuating devices including the control leads therefor. The arrangement in FIGURES 3 and 4 is for the embodiment of FIGURE 2a. In each figure, the large blocks 80 represent the motor device of the system with a shaft and a sheave or sheaves carried thereon.

In FIGURE 3, the motor 80 is first energized by power supplied on lead 89, the circuit being completed through windings of units 87 and 88 to ground. The shaft 82 which is analogous to shaft 30 to FIGURE 2a, rotates to drive sheaves 84 and 86 continuously. Actuators 87 and 88, which are analogous to actuators 34 and 36 in FIG. 2a, include in this embodiment power windings and control solenoid windings, the latter being connected to the control circuit by leads 83 and 85. A signal over the control leads will operate the respective actuator solenoid to connect the power windings to the motor power circuit on lead 81 and the actuator will then effect a power transfer by tightening the belt associated therewith as heretofore explained.

In FIGURE 4, the motor 80 is arranged to start and stop responsive to actuator operation. Power for the motor and the actuators is supplied via lead 90 with control signals being supplied on leads 92 and 93. A control signal or lead 93 will, for example, operate actuator 87 and the motor to effect a power transfer via sheave 86.

In the foregoing embodiments, it will be apparent that two separate modes of movement can be achieved by the controlled application of electric signals on control leads to actuating devices of simple and inexpensive construction.

Figure 5:
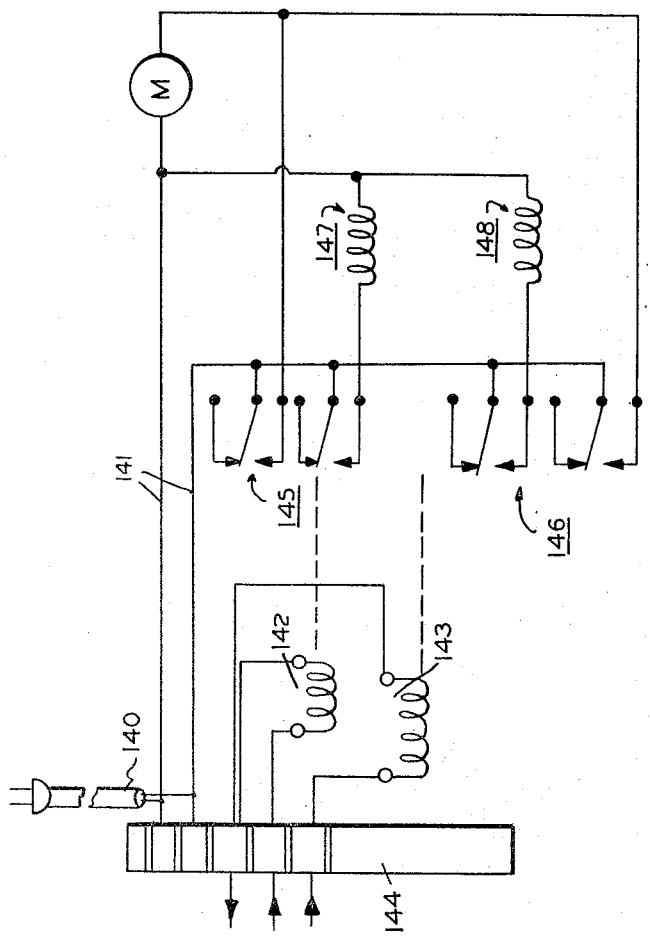
FIGURE 5 is a schematic view of one embodiment of the control actuating circuit.

FIGURE 5 relates to an embodiment of the control actuator circuit wherein auxiliary relays are provided. Element 144 represents a standard terminal board of the sandwich type with alternately disposed conductor and insulator sections. Connected therewith is a power supply cable 140 having leads 141 connected to the motor of the system and to double contact sets 145 and 146. Solenoid coils 147 and 148 are included and represent the solenoids for the control actuators such as units 34 and 36 in FIGURE 2a, hereinbefore described. The auxiliary relays 142 and 143 are connected to the terminal board 144 and receive control signals therethrough. In operation, a signal energizing relay 142 will close contact set 145 to energize both the solenoid 147 and the motor; operation of relay 143 accomplishing a similar function via contact set 146 and solenoid 148. This arrangement will permit the control circuit signals to be of a low order in that the relays 142 and 143 are not required to carry heavy currents for actuator or motor operation.

Control circuit

Figure 6:
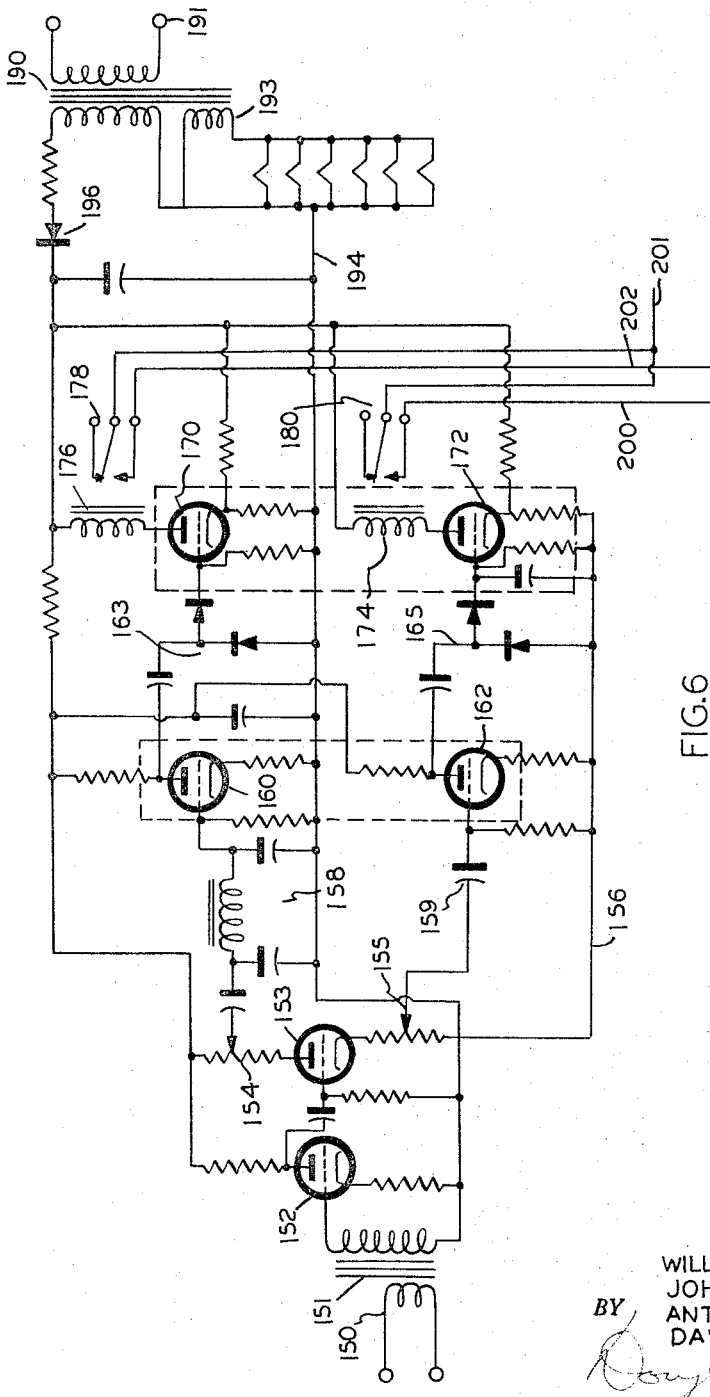
FIGURE 6 is a schematic view showing the electronic portion of the control circuit in detail.

A particular control circuit is shown in FIGURE 6. This circuit comprises generally a control input 150 and a power input 191 each being coupled by transformers 151 and 190, respectively, for isolation from associated equipment. The power transformer 190 additionally performs a stepdown function whereby standard 125 volt current is transformed into 6.3 volts on the secondary for proper tube operation, the six tube filaments being supplied from secondary 193 via lead 194. The signal input 150 may be connected to any standard 8 or 16 ohm speaker circuit of a device having an audio section such as in television or radio sets. Audio or speaker voltages on input 150 will operate through the transformer 151 to be amplified in a first amplifying stage, including triode 152, the grid and cathode thereof. The anode circuit of tube 152 is connected to the grid of tube 153 which effects signal splitting to provide a signal for each of two channels. The inductance-capacitance combination 158 connected to the grid of tube 160 constitutes a standard filter for attenuation of high frequencies to form a low frequency channel. The resistance-capacitance combination 159 similarly acts to block low frequencies to form a high frequency channel. Tubes 160 and 162 amplify the signals of each frequency channel and tubes 170 and 172, after a filtering and rectifying operation in 163 and 165, further amplify the signals of each frequency channel. The plate circuits of tubes 170 and 172 are connected to relay coils 176 and 174 each having a set of contacts 178 and 180 respectively. The contact sets are arranged so that upon operation, a circuit is closed between a lead 202 and common lead 201 to the low frequency solenoid of the control actuating device; or a circuit is closed between lead 200 and common lead 201 to the high frequency solenoid of a second control actuating device.

The motor of the system may be powered as hereinbefore described or alternatively can be supplied by a lead from the secondary of the power input to a current sensitive relay disposed between the motor and the 125 volt supply.

The operation of the circuit will first amplify audio or speaker voltages then split the voltage into two separate signals. The frequency selective portion of the circuit will accomplish a sampling of the audio signal so that the presence of either high frequency components or low frequency components will result in selective relay operation. The amplifying stages will assure the proper level of voltage for relay operation for each channel. The control circuit of the invention thereby effects a translation of audio energy into control signals for operation of power driven equipment. It will be readily appreciated that various arrangements of dual frequency signals properly timed could be employed with the control circuit to effect a predetermined pattern of movement modes synchronized with any desired pattern of intelligence and communication.

Figure 7:
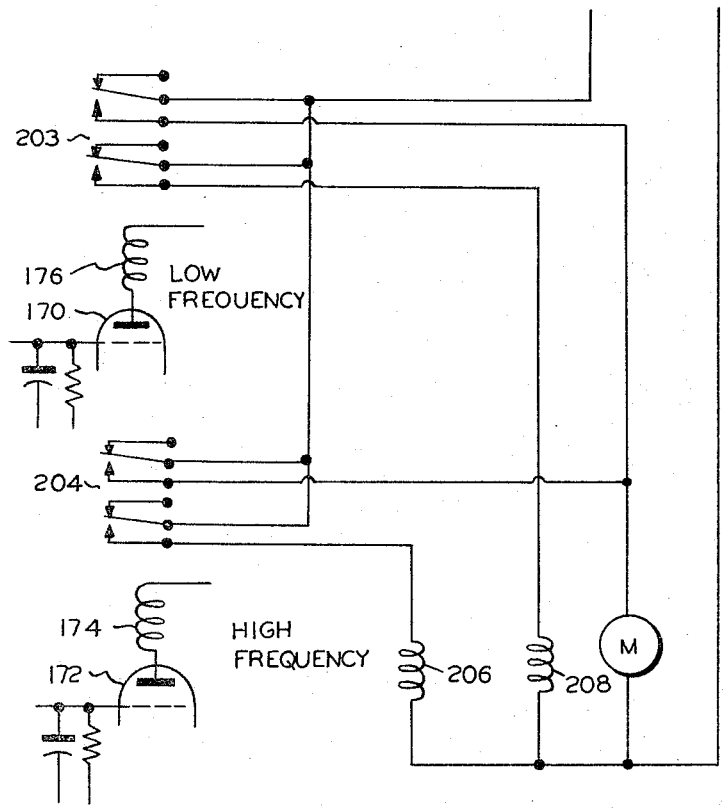
FIGURE 7 is a schematic view showing a second embodiment of the control actuating circuit.

FIGURE 7 shows an exemplary form of the control circuit in conjunction with a more detailed schematic diagram of a control actuating circuit utilizing auxiliary relays. Tubes 170 and 172 will be recognized as the last amplifying stage in FIGURE 6 with relays 176 and 174 there connected. Closure of contact set 203 by a signal on the plate circuit of tube 170 will effect, via the conductors as shown, current flow to energize solenoid 208 and the motor device. Contact set 204 will be similarly operated to energize solenoid 206 and the motor device.

FIGURE 8 is included to show the over-all arrangement including the signal waveform in various stages of the circuit. Unit 220 represents the audio section of whatever unit is being used to supply the control signals. Leads 222 represent the usual supply leads for speaker 224. Element 250 represents the relay coil associated with the final amplifying stage plate circuit and contact 253 represents the contact set controlled thereby. The solenoid 254 is the solenoid for one control actuating device and hence one mode of movement with 256 performs this function for a second mode of movement operation.

Lead 257 and ground 258 would, in a complete embodiment, be shown leading into a part of the circuitry shown as FIG. 3, with lead 257 corresponding to lead 89, and ground 258 corresponding to the ground in FIG. 3.

The scope of the invention hereinbefore described may be measured by the appended claims.

What is claimed as new is as follows:

1. An electrical sound producing communications system emitting at least two sets of electric intelligence signals representative of high frequency and low frequency auditory sound respectively, circuit means responsive to said electric signals, means for effecting signal splitting of said two sets of signals, means including a relay for each set of signals, a solenoid responsive to each relay, a first and a second means for imparting the sense of movement to a body; said first and second means being independently responsive to said first and second signals to effect a first mode of movement to said body in coordination with one portion of said intelligence signal and a second mode of movement to said body in coordination with another portion of said intelligence signal.

2. The invention of claim 1 wherein the motorized means is a hobbyhorse; whereby one mode of hobbyhorse movement will occur responsive to one set of electric impulses and a second mode of hobbyhorse movement will occur responsive to another set of electric impulses.

3. The combination as in claim 1 wherein said circuit means includes a standard filter forming a low and a high frequency channel.

References Cited by the Examiner

UNITED STATES PATENTS

| | | | |
|---|---|---|---|
| 2,719,715 | 10/1955 | Leahan | 272—18 |
| 2,821,191 | 1/1958 | Paii | 128—33 |
| 2,842,774 | 7/1958 | Vitt | 3—1.1 |

RICHARD A. GAUDET, *Primary Examiner.*

LAWRENCE W. TRAPP, *Examiner.*